US010441060B1

(12) United States Patent
Pinholster, Jr. et al.

(10) Patent No.: US 10,441,060 B1
(45) Date of Patent: Oct. 15, 2019

(54) HAMMOCK STAND

(71) Applicant: Eagles Nest Outfitters, Inc., Asheville, NC (US)

(72) Inventors: Peter G. Pinholster, Jr., Asheville, NC (US); James Christian Frinak, Asheville, NC (US); Elisha Halsey Brinton, Asheville, NC (US)

(73) Assignee: Eagles Nest Outfitters, Inc., Asheville, NC (US)

( * ) Notice: Subject to any disclaimer, the term of this patent is extended or adjusted under 35 U.S.C. 154(b) by 180 days.

(21) Appl. No.: 15/668,252

(22) Filed: Aug. 3, 2017

Related U.S. Application Data

(60) Provisional application No. 62/370,494, filed on Aug. 3, 2016.

(51) Int. Cl.
| | |
|---|---|
| *A45F 3/24* | (2006.01) |
| *A45F 3/22* | (2006.01) |
| *A47C 9/10* | (2006.01) |
| *A47C 17/64* | (2006.01) |
| *F16M 11/16* | (2006.01) |
| *F16M 11/26* | (2006.01) |

(52) U.S. Cl.
CPC ............... *A45F 3/24* (2013.01); *A47C 9/105* (2013.01); *A47C 17/645* (2013.01); *F16M 11/16* (2013.01); *F16M 11/26* (2013.01); *A45F 3/22* (2013.01); *A45F 2200/05* (2013.01)

(58) Field of Classification Search
CPC ..................................... A45F 3/24; A45F 3/22
USPC ............ 5/130, 127, 128, 129, 120, 121, 122
See application file for complete search history.

(56) References Cited

U.S. PATENT DOCUMENTS

| | | | | |
|---|---|---|---|---|
| 115,128 | A * | 5/1871 | Southwick | A45F 3/24 5/130 |
| 209,275 | A * | 10/1878 | Leycester | A45F 3/24 5/130 |
| 224,178 | A * | 2/1880 | Edson | A45F 3/24 5/128 |
| 298,515 | A * | 5/1884 | Sutphen | A45F 3/24 5/128 |

(Continued)

FOREIGN PATENT DOCUMENTS

WO WO-8605081 A1 * 9/1986 ............... A45F 3/24

OTHER PUBLICATIONS

Hammock Stands; Hammock Stands by TATO Gear; http://www.tatogear.com/outdoor/products/hammock-stands/.

*Primary Examiner* — Robert G Santos
(74) *Attorney, Agent, or Firm* — Schwartz Law Firm, P.C.

(57) ABSTRACT

A portable hammock stand includes first and second identical collapsible pod assemblies. Each pod assembly incorporates a plurality of elongated rigid legs having respective top and bottom ends. A top fastening hub holds the legs together proximate their top ends, and the bottom ends of the legs diverging to a ground surface. A flexible suspension strap extends downwardly from the top fastening hub, and has a free end adapted for hanging a first end of a flexible hammock. An elongated ridge pole extends substantially horizontally between the first and second pod assemblies, and has first and second opposite ends. The first end of the ridge pole attaches to the first suspension strap between its free end and the first top fastening hub, and the second end of the ridge pole attaches to the second suspension strap between its free end and second top fastening hub.

18 Claims, 6 Drawing Sheets

(56) References Cited

U.S. PATENT DOCUMENTS

| | | | | |
|---|---|---|---|---|
| 460,804 A * | 10/1891 | Welling | A45F 3/24 | 5/130 |
| 488,272 A * | 12/1892 | Else | A45F 3/24 | 5/130 |
| 631,602 A * | 8/1899 | Wood | A45F 3/24 | 5/130 |
| 648,355 A | 4/1900 | Doolittle | | |
| 714,554 A * | 11/1902 | Augustus | A45F 3/24 | 5/130 |
| 769,913 A * | 9/1904 | Noble | A45F 3/24 | 5/128 |
| 811,166 A * | 1/1906 | Nuessen | A45F 3/24 | 5/128 |
| 907,687 A * | 12/1908 | Emmert | A45F 3/24 | 5/130 |
| 1,062,950 A * | 5/1913 | Boss | A45F 3/22 | 5/116 |
| 1,066,668 A | 7/1913 | Sisbower | | |
| 2,251,299 A * | 8/1941 | Spangler | A45F 3/24 | 135/96 |
| 2,524,499 A * | 10/1950 | Weir | A45F 3/24 | 5/119 |
| 4,757,563 A * | 7/1988 | An | A45F 3/24 | 135/155 |
| 5,035,012 A * | 7/1991 | Westrich | A45F 3/24 | 403/377 |
| 6,470,518 B1 * | 10/2002 | Ke | A45F 3/24 | 5/120 |
| D573,381 S * | 7/2008 | Pinholster, Jr. | D6/387 | |
| D666,896 S * | 9/2012 | Pinholster, Jr. | D8/356 | |
| 9,003,579 B1 * | 4/2015 | Pinholster, Jr. | A45F 3/22 | 5/120 |
| 9,320,343 B1 * | 4/2016 | Pinholster, Jr. | A45F 3/22 | |
| 9,622,566 B1 * | 4/2017 | Pinholster, Jr. | A45F 3/22 | |
| 9,750,329 B1 * | 9/2017 | Pinholster, Jr. | A45F 3/22 | |
| 9,907,389 B2 * | 3/2018 | Conlin | A45F 3/24 | |
| 10,034,534 B1 * | 7/2018 | Pinholster, Jr. | A45F 3/24 | |
| 10,292,485 B2 * | 5/2019 | Conlin | A45F 3/24 | |
| 2017/0127808 A1 * | 5/2017 | Conlin | A45F 3/24 | |
| 2018/0146769 A1 * | 5/2018 | Conlin | A45F 3/24 | |

* cited by examiner

HAMMOCK STAND

TECHNICAL FIELD AND BACKGROUND OF THE DISCLOSURE

The present disclosure relates broadly and generally to a hammock stand. In exemplary embodiments, the present hammock stand is constructed primarily of aluminum and plastic, and is readily portable and lightweight—having a packaged weight under 15 lbs. The exemplary hammock stand may disassemble and pack into a custom carrying case, and may be safely re-assembled and used on virtually any given terrain.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a portable and collapsible hammock stand. The exemplary hammock stand includes first and second identical free-standing pod assemblies. Each pod assembly incorporates a plurality of elongated rigid legs having respective top and bottom ends. A top fastening hub holds the legs together proximate their top ends, and the bottom ends of the legs diverging to a ground surface. A flexible suspension strap extends downwardly from the top fastening hub, and has a free end adapted for hanging a first end of a flexible hammock. An elongated ridge pole extends substantially horizontally between the first and second pod assemblies, and has first and second opposite ends. The first end of the ridge pole attaches to the first suspension strap between its free end and the first top fastening hub, and the second end of the ridge pole attaches to the second suspension strap between its free end and second top fastening hub.

According to another exemplary embodiment, each of the first and second pod assemblies comprises 4 equally-spaced, elongated rigid legs. In alternative embodiments, each pod assembly may have three or fewer legs, or may have more than 4 legs.

According to another exemplary embodiment, a first base stabilizer cord is attached to an outside 2 of the rigid legs, and second base stabilizer cord attached to an inside 2 of the rigid legs.

According to another exemplary embodiment, the first and second base stabilizer cords are attached together at a center point between the 4 rigid legs.

According to another exemplary embodiment, a buckle fastener releasably attaches the first and second base stabilizer cords together at the center point between the 4 rigid legs.

According to another exemplary embodiment, an enlarged footpad is located at the bottom end of each of the plurality of rigid legs. The exemplary footpads add stability, and may help prevent the hammock stand from sinking into soft ground.

According to another exemplary embodiment, a looped anchor cord is attached to each foot pad. The anchor cord is adapted for receiving a ground anchor to further stabilize the hammock stand on the ground.

According to another exemplary embodiment, each of the rigid legs comprises an assembly of interconnected shock-corded leg sections. In this exemplary embodiment, the elastic shock cords enable ready and convenient assembly, disassembly, and transport of the pod assemblies.

According to another exemplary embodiment, the ridge pole comprises an assembly of interconnected shock-corded pole sections. In this exemplary embodiment, the elastic shock cord enable ready and convenient assembly, disassembly, and transport of the ridge pole.

According to another exemplary embodiment, the flexible suspension strap comprises a plurality of spaced-apart hammock attachment loops.

According to another exemplary embodiment, the suspension strap further comprises a folded pole stop adjacent the top fastening hub and spaced apart from a first of the hammock attachment loops.

According to another exemplary embodiment, the ridge pole comprises a vertically slotted end cap located at each of the first and second ends. The end cap receives and frictionally engages the suspension strap between the folded pole stop and the first of the hammock attachment loops.

In yet another exemplary embodiment, the present hammock stand comprises only a single multi-legged pod assembly. The pod assembly may be identical to that described above. In this embodiment, a first end of the elongated horizontal ridge pole attaches to the suspension strap between the free end of the strap and the top fastening hub. The free end of the suspension strap is adapted for hanging a first end of a flexible hammock. The second end of the ridge pole is configured to extend substantially horizontally from the suspension strap to a spaced apart (remote) support structure from which a second end of the flexible hammock is hung. The remote support structure may comprise any other alternately constructed stand, vertical frame, post, tree, wall mount, or other suitable structure.

The term "hammock" refers broadly herein to any hanging bed, seat, couch, or other suspended or partially suspended support or sling made of any rigid and/or flexible material including nylon, canvas, netted cord, rigid framing or the like. Exemplary hammocks may have straps, cords, cables, lines, chains, or other extensions attached to supports at one or both ends.

The term "suspension strap" (or the like) refers broadly herein to any flexible strap, bungee cord, cable, rope, line, webbing, extension, chain or the like capable of securing an end of a hammock to the pod assembly. In one exemplary embodiment, the suspension strap may be constructed as disclosed in Applicant's prior issued U.S. Pat. Nos. 9,003, 579; 9,320,343; and 9,622,566. The complete disclosures of Applicant's prior patents are incorporated herein by reference.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
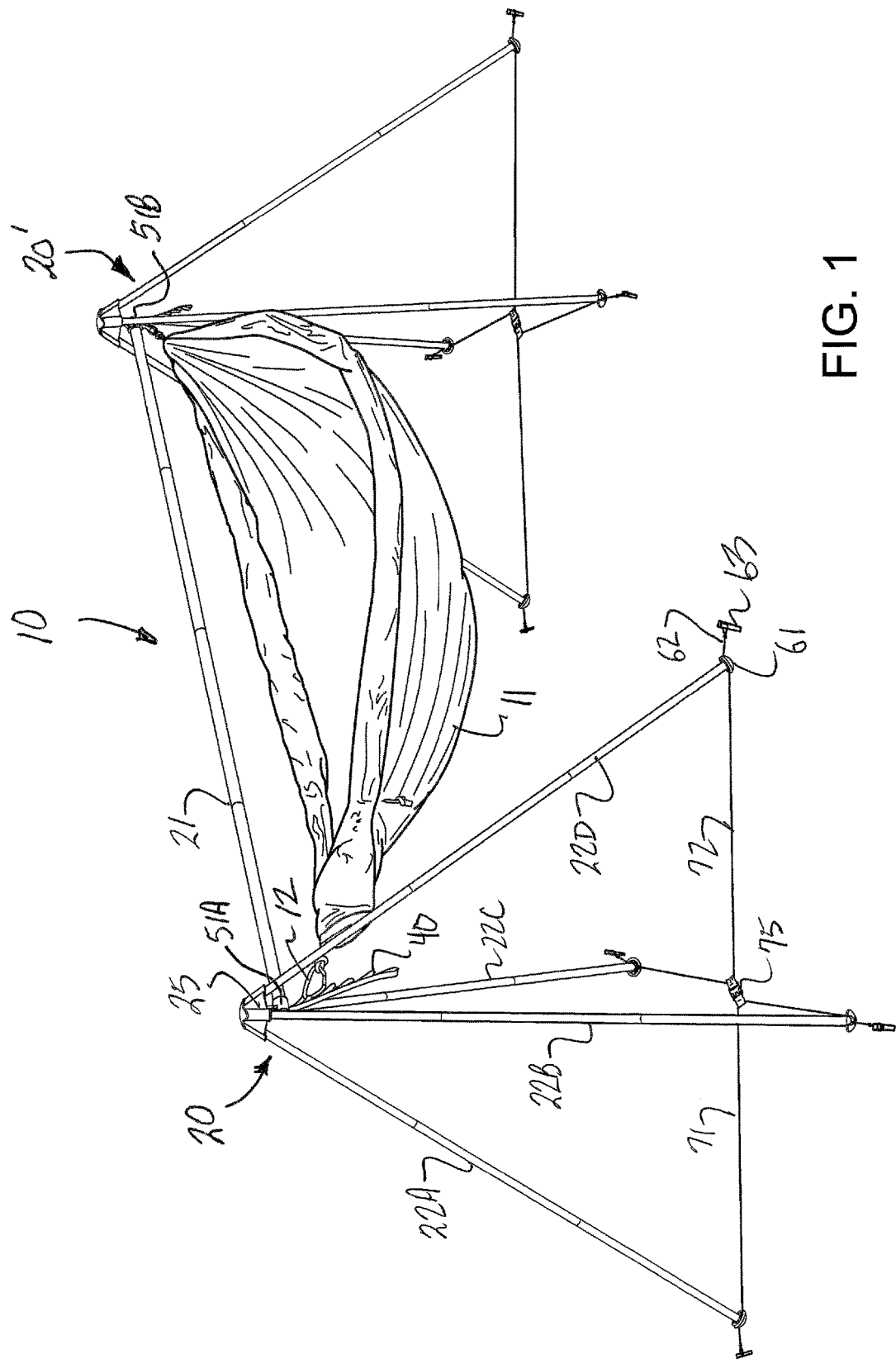
FIG. 1 is an environmental perspective view of the present hammock stand according to one exemplary embodiment, and showing the stand supporting a conventional fabric hammock.
Figure 2:
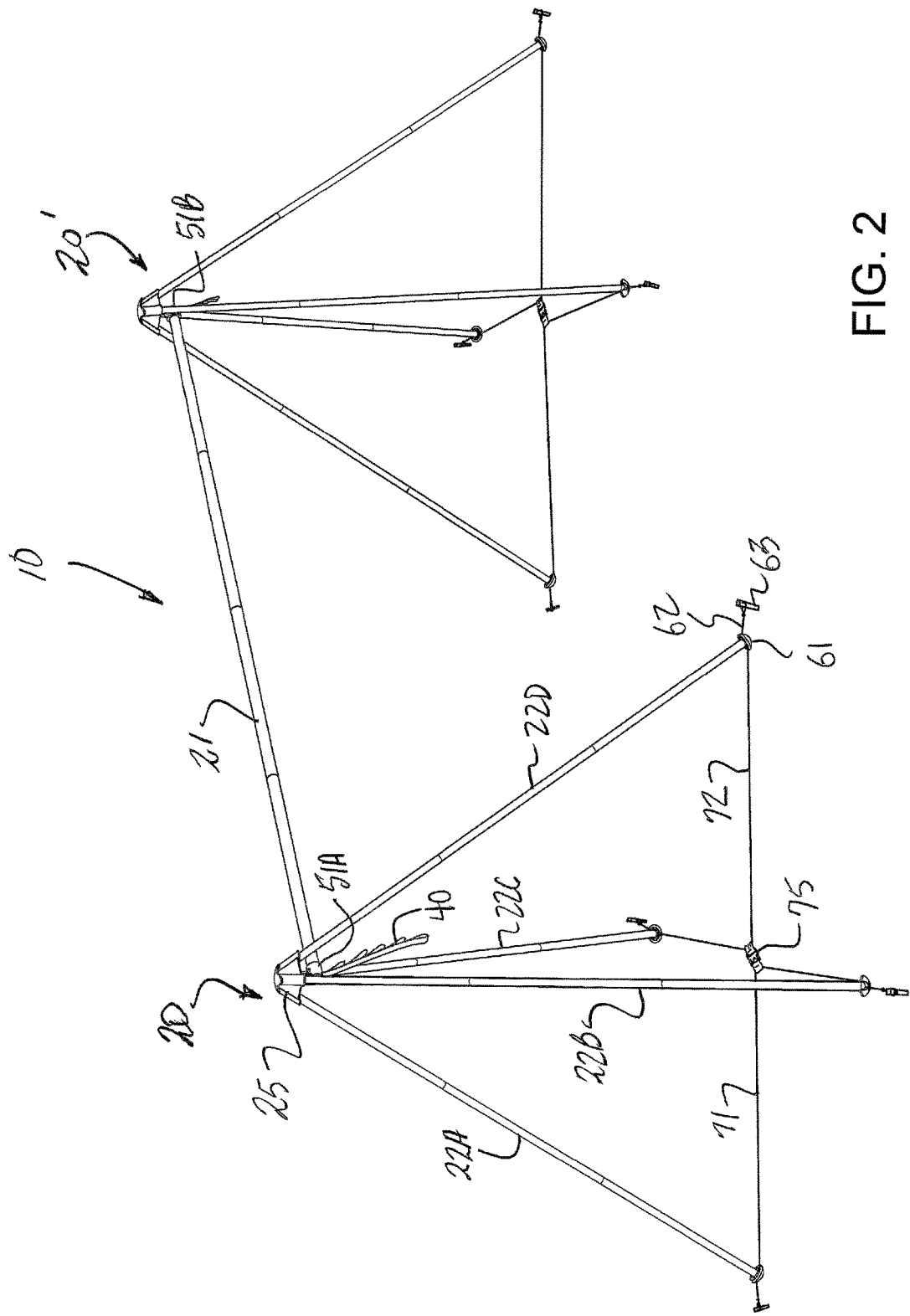
FIG. 2 is a further perspective view of the exemplary hammock stand with the fabric hammock removed.

Referring now specifically to the drawings, a portable and collapsible hammock stand according to one exemplary embodiment of the present disclosure is illustrated in FIGS. 1 and 2, and shown generally at broad reference numeral 10. The present hammock stand 10 is designed for hanging any flexible hammock 11, such as a conventional single or double-nest outdoor hammock. Such hammocks are commonly fabricated of a lightweight durable and breathable quick drying fabric, such as nylon, and may have a load capacity of 400 pounds or more. Typically, short attachment cords located at opposite ends of the hammock 11 are tied to respective metal karabiners 12 (snap hooks, S-hooks, O-rings, D-rings, and/or other hardware). The karabiners 12 may be used to releasably attach the hammock ends to the present hammock stand 10, as described further below. In exemplary embodiments, the hammock stand 10 is constructed of lightweight shock-corded components, and is designed for convenient transport and assembly at any desired location.

Figure 3:
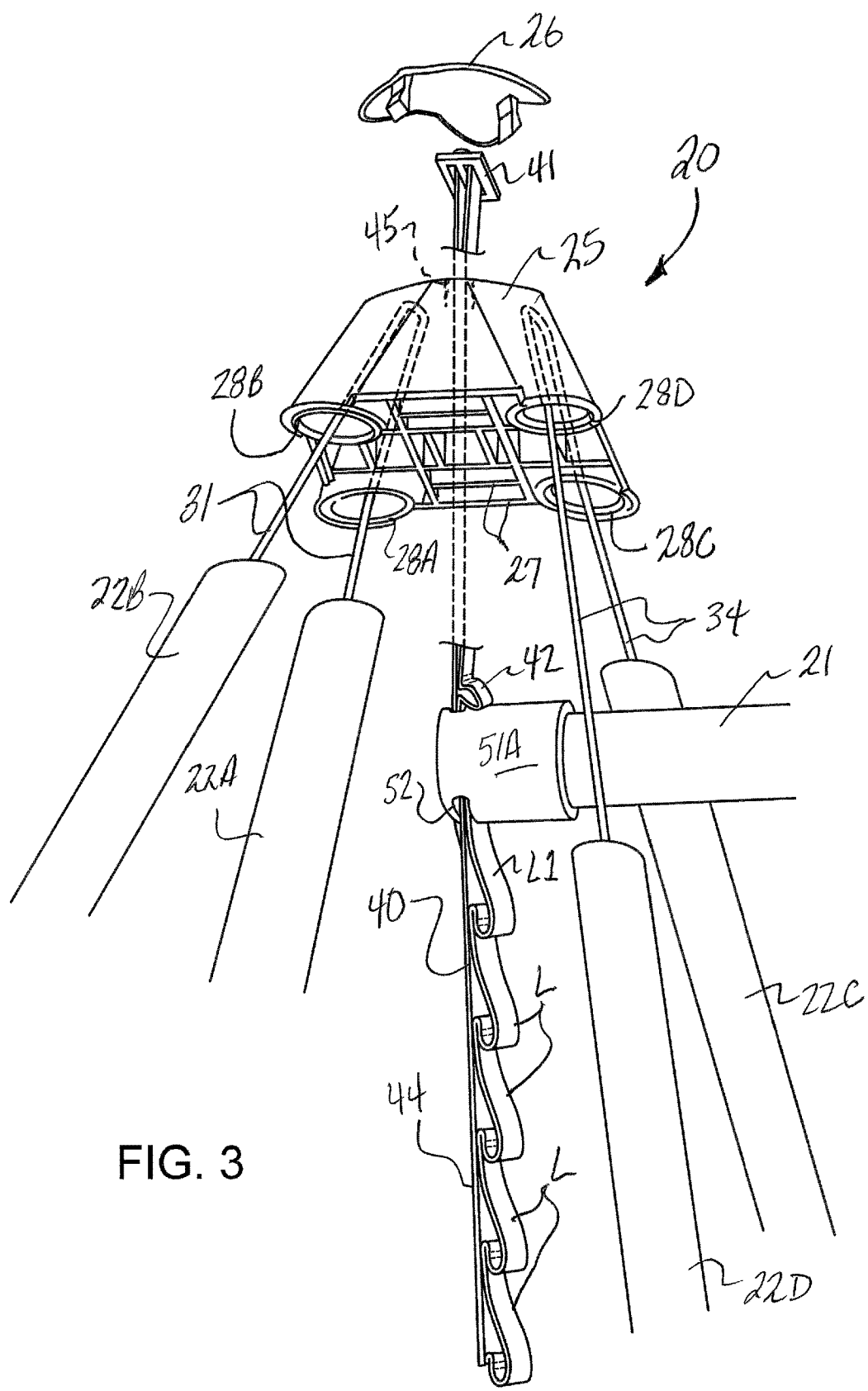
FIG. 3 is an fragmentary perspective view of the pod assembly with portions of the assembly exploded away.
Figure 4:
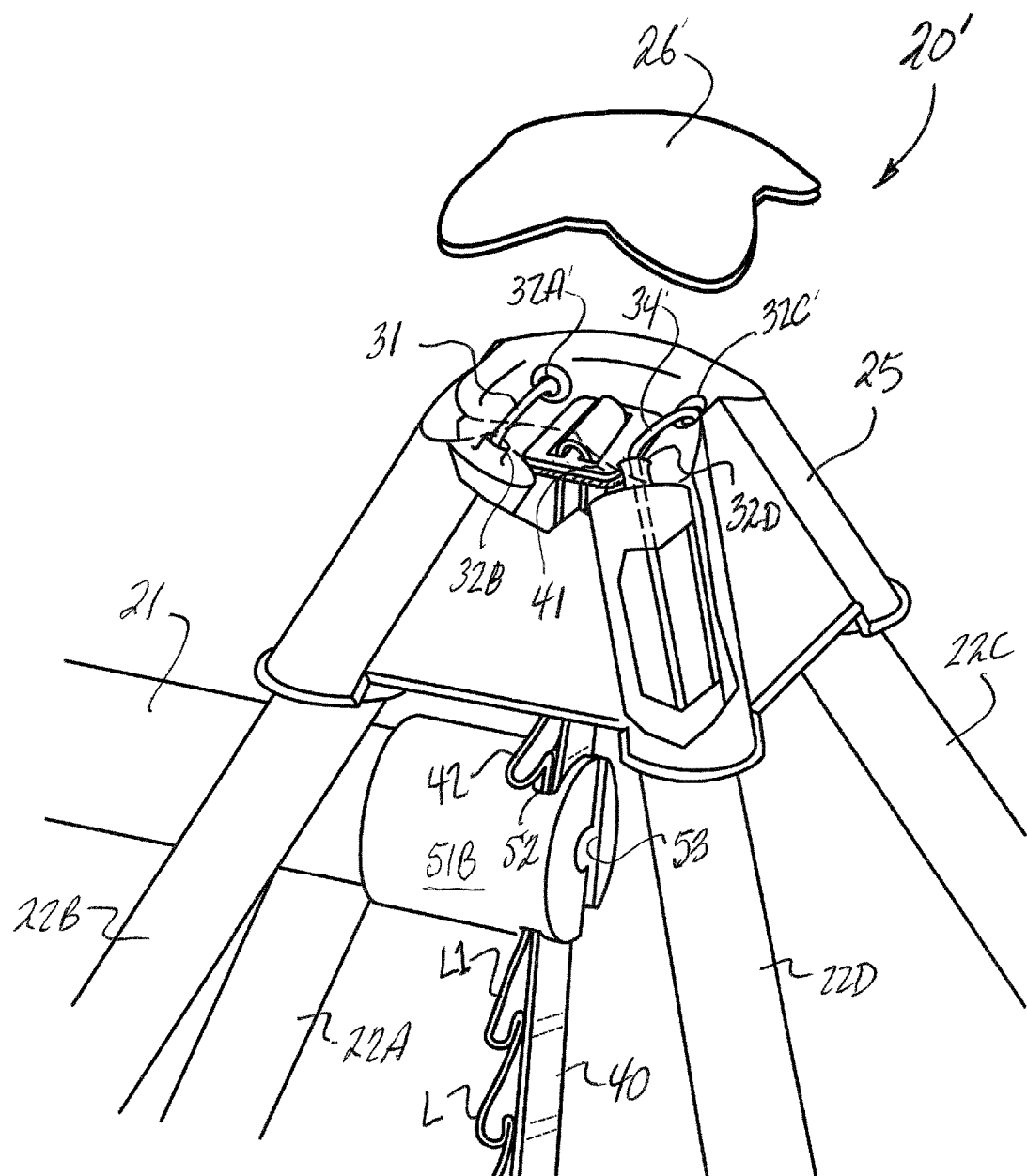
FIG. 4 is a further fragmentary perspective view of the pod assembly with a top cap of the fastening hub removed.
Figures 5, 5A, 5B:
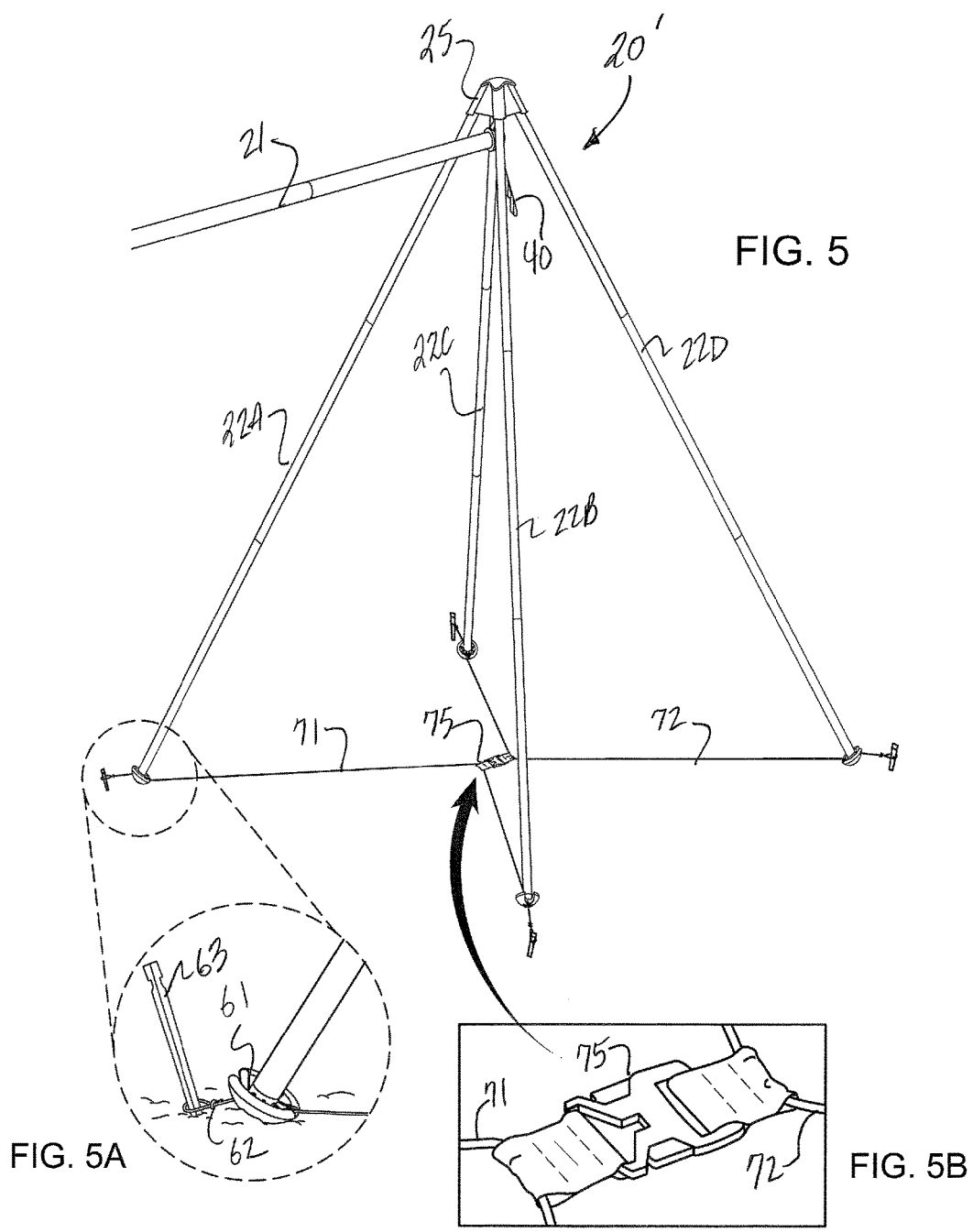
FIG. 5 is a perspective view showing one of two pod assemblies of the exemplary hammock stand.
FIG. 5A shows an enlarged view of the footpad.
FIG. 5B shows an enlarged view of the buckle fastener used for joining the stabilizer cords.

Referring to FIGS. 2, 3 and 4, the present hammock stand 10 includes first and second identical free-standing pod assemblies 20, 20' separated by an elongated horizontal ridge pole 21. The ridge pole 21 may be formed in multiple hollow sections having respective male and female connecting ends. While the description below refers primarily to elements and features of pod assembly 20, it is understand that pod assembly 20' incorporates identical elements and features.

Each pod assembly 20, 20' incorporates a plurality of elongated, equally-spaced, rigid legs 22A, 22B, 22C, and 22D. A top fastening hub 25 holds the legs 22A-22D together proximate their top ends, while the bottom ends of the legs 22A-22D diverge to the ground. As best shown in FIG. 3, the exemplary fastening hub 25 comprises a removable cap 26, integrally molded ribs 27, and four equally spaced underside leg sockets 28A, 28B, 28C, and 28D. The leg sockets 28A-28D are configured to removably receive respective top ends of the legs 22A-22D. Each leg 22A-22D may be formed in multiple hollow tubular sections having connecting male and female ends assembled together by an elastic shock cord. As shown in FIGS. 3 and 4, a first shock cord 31 attaches at bottom ends of legs 22A and 22B, and extends through the assembled legs 22A, 22B, through adjacent leg sockets 28A, 28B and through top openings 32A, 32B in the fastening hub 25. The second pair of legs 22C and 22D is assembled in an identical manner using a second elastic shock cord 34 attached at bottom ends of the legs 22C, 22D, and passing through the assembled legs 22C, 22D, through leg sockets 28C, 28D, and top openings 32C, 32D in the fastening hub 25. The ridge pole 21 and legs 22A-22D may be fabricated of a lightweight aluminum alloy or other metal. In other exemplary embodiments, each of the ridge pole 21 and legs 22A-22D may comprise a single-length integrated structure fabricated of plastic, fiberglass, wood, or other suitable material. In still further embodiments, the exemplary ridge pole 21 and legs 22A-22D may comprise multiple telescoping sections with one or more spring-loaded detents and longitudinally-spaced holes enabling ready and convenient length adjustment.

As best shown in FIGS. 3 and 4, a flexible suspension strap 40 is centrally attached to the top fastening hub 25, and extends downwardly from the hub 25 between the equally-spaced diverging pod legs 22A-22D. In one exemplary embodiment, the flexible strap 40 comprises a folded length of fabric webbing threaded through slots of a rectangular metal slide 41, and folded upon itself to form first and second overlying strap sections. In one embodiment, the overlying strap sections are machine-sewn at various attachment points to form an upper (folded) pole stop 42 and a multi-looped free end 44. The metal slide 41 engages a top surface of the fastening hub 25 adjacent a center hub opening 45, while the looped free end 44 of the strap 40 extends through the hub opening 45 and towards the ground. The loops "L" in the suspension strap 40 are formed between adjacent attachment points and corresponding secured (or unsecured) folded portions to create a "shingle like" design or profile. The exemplary suspension strap 40 may have between 4 and 8 longitudinally adjacent (or spaced) loops "L", and may be constructed of an 8-ounce, 0.75 inch, flat nylon or polyester material. The multiple loops "L" allow the hammock 11 to be hung at different selected points along the cooperating suspension straps 40 of pod assemblies 20, 20', thereby adjusting the elevation and tension of the hammock 11 as desired by the user.

The space formed with the suspension strap 40 between the upper pole stop 42 and first hammock attachment loop "L1" is designed to receive and locate a vertically-slotted end cap 51A, 51B of the horizontal ridge pole 21. The slotted caps 51A, 51B are located at opposite ends of the ridge pole 21 and function to secure the ridge pole 21 to the suspension straps 40 of pod assemblies 20 and 20', such that the ridge pole 21 is freely suspended just below respective top fastening hubs 25 of each assembly 20, 20' The narrow slot 52 in each end cap 51A, 51B holds the pole end in position along a length of the suspension strap 40 thereby preventing the ridge pole 21 from sliding upwardly towards the fastening hub 25 and downwardly beyond the hammock attachment loops "L", The strap 40 may be readily inserted into the cap slot 52 through an offset vertical opening 53 (FIG. 4) formed in the face of the cap 51A, 51B.

Referring again to FIG. 1, with the exemplary hammock stand 10 assembled as described above, opposite ends of the flexible hammock 11 are attached to selected loops "L" of the suspension straps 40 of pod assemblies 20, 20' using the metal karabiners 12. When the hammock 11 is occupied by a user, the suspended ridge pole 21 may increase the overall stability of the stand 10 while preventing the weight of the user from tipping the pod assemblies 20, 20' inwardly towards each other. Additionally, the legs 22A-22D of each pod assembly 20, 20' may comprised enlarged bowl-shaped footpads 61 best shown in FIGS. 1, 2, 5 and 5A. The footpads 61 may further increase stability of the hammock stand 10 when occupied, and may help prevent the stand 10 from sinking into soft ground. A looped anchor cord 62 may also be attached to each foot pad 61, and designed to receive a ground stake 63 or other anchoring device.

In exemplary embodiments, the present hammock stand 10 may be further reinforced by using cooperating base stabilizer cords 71 and 72. As best shown in FIGS. 1, 2, 5 and 5B, the first stabilizer cord 71 is attached to an outside two of the rigid stand legs 22A, 22B, while the second stabilizer cord 72 attaches to an inside two of the stand legs 22C, 22D. The first and second stabilizer cords 71, 72 are then releasably joined together at a center point between the four legs 22A-22D using a buckle fastener 75. When fastened, the stabilizer cords 71, 72 cooperate to pull or curve the stand legs 22A-22D slightly towards one other. This pre-loads the legs along a generally X-shaped cord path, thereby increasing the overall load capacity of the hammock stand 10.

Figure 6:
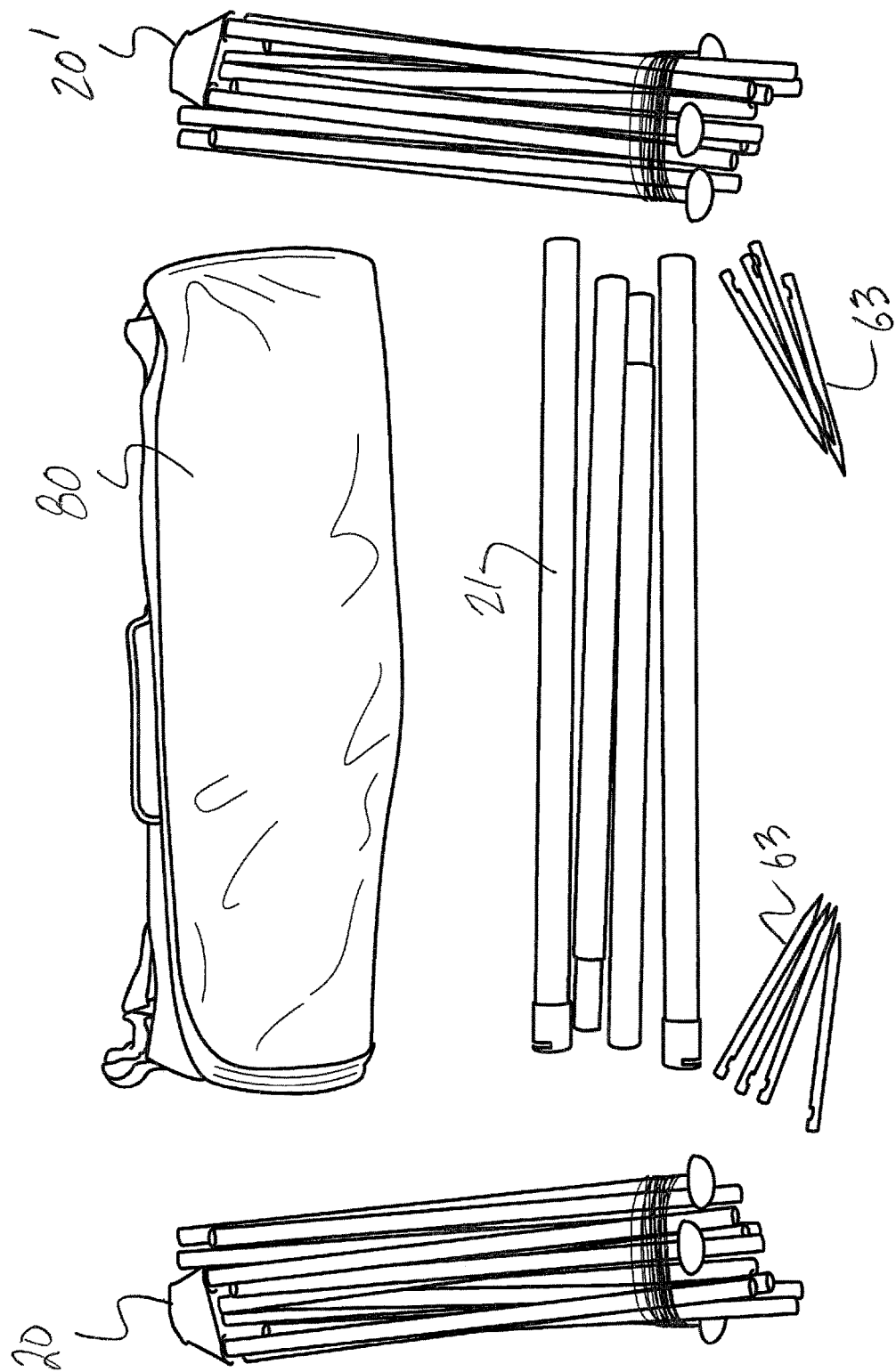
FIG. 6 shows various components of the exemplary hammock stand disassembled and ready for inserting into a portable travel case.

FIG. 6 shows various components of the exemplary hammock stand 10 including pod assemblies 20, 20', the ridge pole 21, and ground stakes 63 disassembled and ready for insert into a carry case 80 for convenient transport. When packaged inside the carry case 80, the entire assembly may weigh only 15 pounds or less.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:
1. A portable hammock stand, comprising:
  a first pod assembly comprising:
    (i) a first plurality of elongated rigid legs having respective top and bottom ends;
    (ii) a first top fastening hub holding said legs together proximate their top ends, and the bottom ends of said legs diverging to a ground surface;
    (iii) a first flexible suspension strap extending downwardly from said first top fastening hub, and having a free end comprising a plurality of spaced-apart hammock attachment loops adapted for hanging a first end of a flexible hammock;

a second pod assembly spaced apart from said first pod assembly, and comprising:
(i) a second plurality of elongated rigid legs having respective top and bottom ends;
(ii) a second top fastening hub holding said legs together proximate their top ends, and the bottom ends of said legs diverging to the ground surface;
(iii) a second flexible suspension strap extending downwardly from said second top fastening hub, and having a free end comprising a plurality of spaced-apart hammock attachment loops adapted for hanging a second end of the flexible hammock; and
an elongated ridge pole extending substantially horizontally between said first and second pod assemblies, and having first and second opposite ends, the first end of said ridge pole attaching to said first suspension strap between its free end and said first top fastening hub, and the second end of said ridge pole attaching to said second suspension strap between its free end and said second top fastening hub.

2. The portable hammock stand according to claim 1, wherein each of said first and second pod assemblies comprises 4 equally-spaced, elongated rigid legs.

3. The portable hammock stand according to claim 2, and comprising a first base stabilizer cord attached to an outside 2 of said rigid legs, and a second base stabilizer cord attached to an inside 2 of said rigid legs.

4. The portable hammock stand according to claim 3, wherein said first and second base stabilizer cords are attached together at a center point between said 4 rigid legs.

5. The portable hammock stand according to claim 4, and comprising a buckle fastener releasably attaching said first and second base stabilizer cords together at the center point between said 4 rigid legs.

6. The portable hammock stand according to claim 1, and comprising an enlarged footpad located at the bottom end of each of said plurality of rigid legs.

7. The portable hammock stand according to claim 6, and comprising a looped anchor cord attached to each footpad, and adapted for receiving a ground anchor to further stabilize said hammock stand.

8. The portable hammock stand according to claim 1, wherein each of said rigid legs comprises an assembly of interconnected shock-corded leg sections.

9. The portable hammock stand according to claim 1, wherein said ridge pole comprises an assembly of interconnected shock-corded pole sections.

10. The portable hammock stand according to claim 1, wherein each of said suspension straps further comprises a folded pole stop adjacent a corresponding top fastening hub and spaced apart from a first of said hammock attachment loops.

11. The portable hammock stand according to claim 10, wherein said ridge pole comprises a vertically slotted end cap located at each of said first and second ends, and each said end cap receiving and frictionally engaging a corresponding suspension strap between a corresponding folded pole stop and the first of said hammock attachment loops.

12. A portable hammock stand, comprising:
at least one pod assembly comprising:
(i) a plurality of elongated rigid legs having respective top and bottom ends;
(ii) a top fastening hub holding said legs together proximate their top ends, and the bottom ends of said legs diverging to a ground surface;
(iii) a flexible suspension strap extending downwardly from said top fastening hub, and having a free end comprising a plurality of spaced-apart hammock attachment loops adapted for hanging a first end of a flexible hammock; and
an elongated horizontal ridge pole having first and second opposite ends, the first end of said ridge pole attaching to said suspension strap between the free end of said strap and said top fastening hub, and the second end of said ridge pole configured to extend substantially horizontally to a spaced apart support structure from which a second end of the flexible hammock is hung.

13. The portable hammock stand according to claim 12, wherein said at least one pod assembly comprises 4 equally-spaced, elongated rigid legs.

14. The portable hammock stand according to claim 13, and comprising a first base stabilizer cord attached to an outside 2 of said rigid legs, and second base stabilizer cord attached to an inside 2 of said rigid legs.

15. The portable hammock stand according to claim 14, and comprising a buckle fastener releasably attaching said first and second base stabilizer cords together at the center point between said 4 rigid legs.

16. The portable hammock stand according to claim 12, and comprising an enlarged footpad located at the bottom end of each of said plurality of rigid legs.

17. The portable hammock stand according to claim 12, wherein said suspension strap further comprises a folded pole stop adjacent said top fastening hub and spaced apart from a first of said hammock attachment loops.

18. The portable hammock stand according to claim 17, wherein said ridge pole comprises a vertically slotted end cap located at each of said first and second ends, and said end cap receiving and frictionally engaging said suspension strap between the folded pole stop and the first of said hammock attachment loops.

* * * * *